J. W. IVERY.
APPARATUS FOR MAKING BRIQUETS.
APPLICATION FILED JUNE 27, 1907.
906,430.
Patented Dec. 8, 1908.
5 SHEETS—SHEET 1.
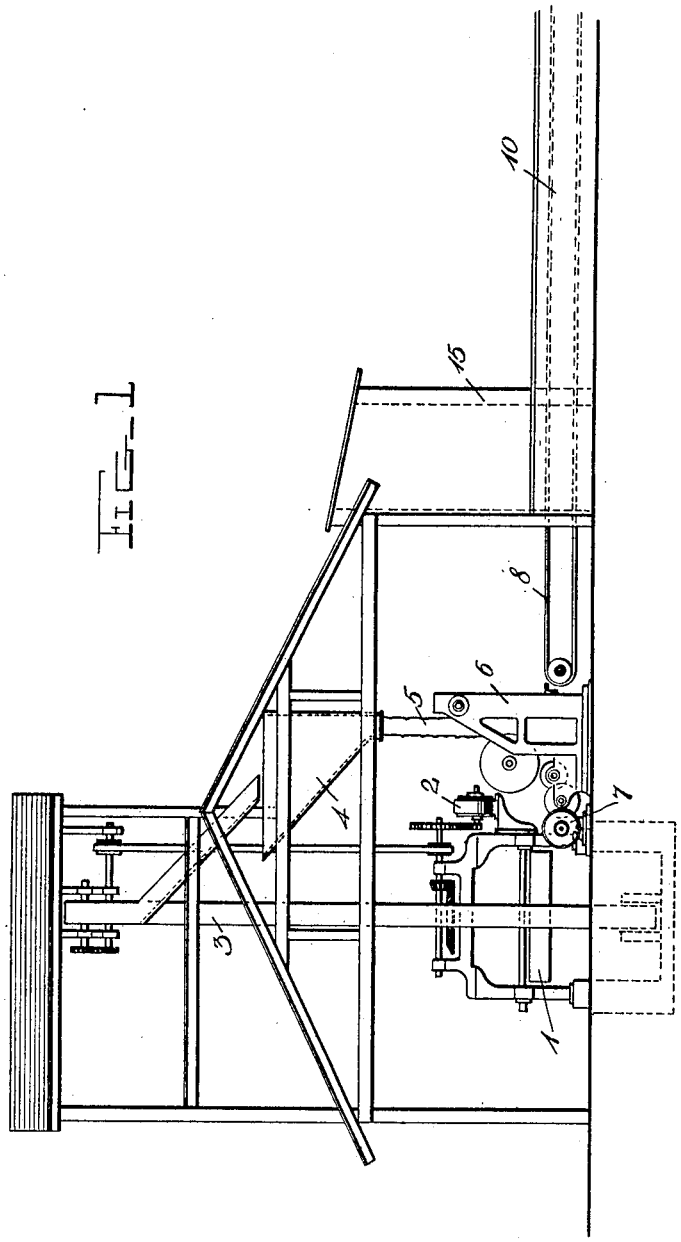
Witnesses
Inventor
John W. Ivery
by H. B. Willson & Co.
Attorneys J. W. IVERY.
APPARATUS FOR MAKING BRIQUETS.
APPLICATION FILED JUNE 27, 1907.
906,430.
Patented Dec. 8, 1908.
5 SHEETS—SHEET 2.
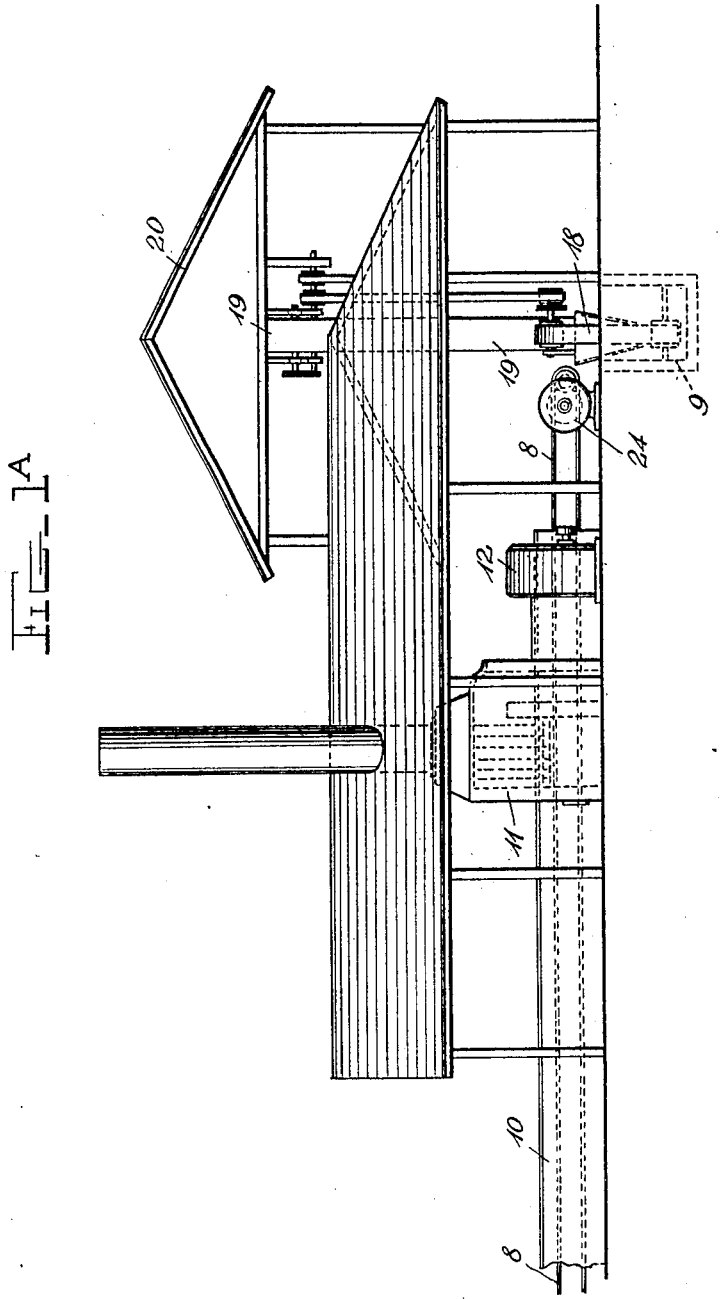
Witnesses
C. H. Griesbauer
Inventor
John W. Ivery
by H. B. Willson & Co.
Attorneys

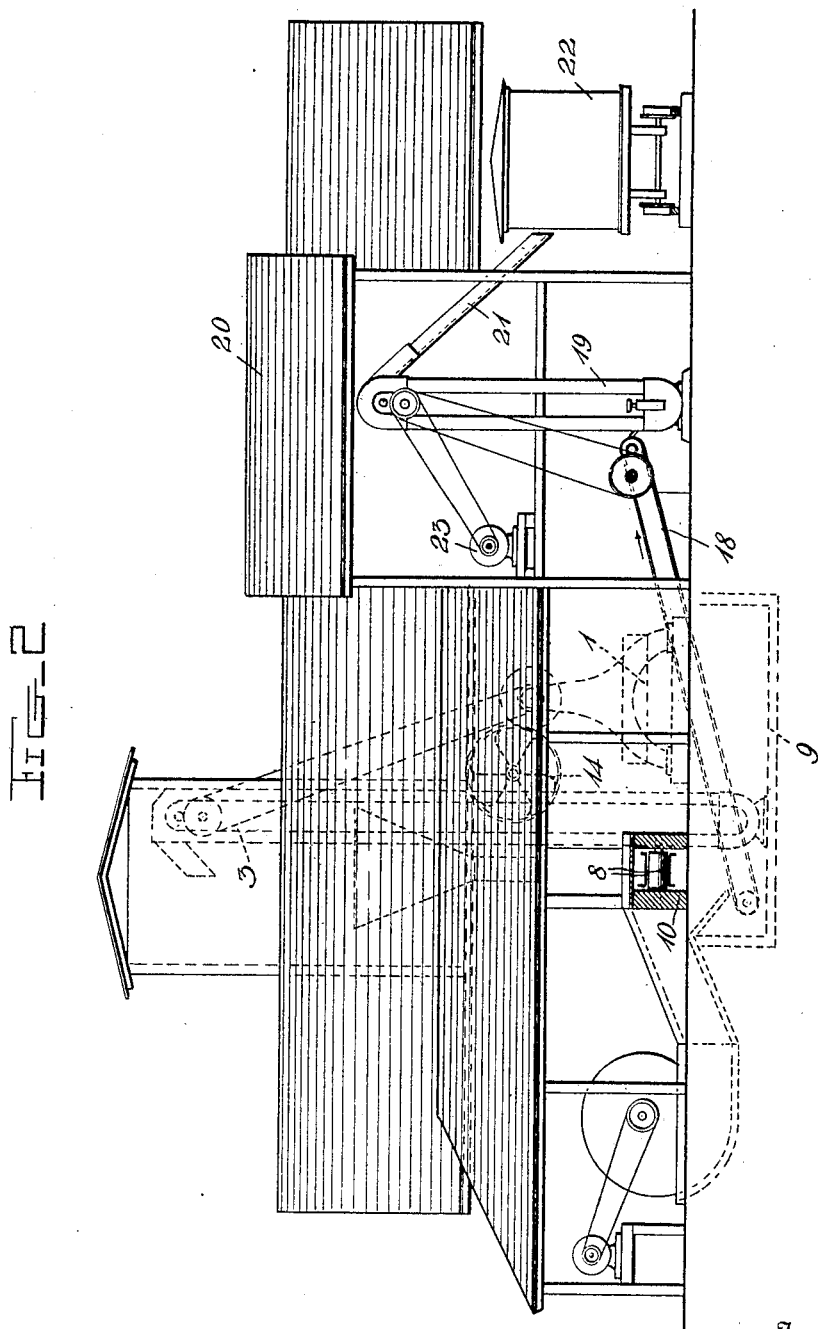

J. W. IVERY.
APPARATUS FOR MAKING BRIQUETS.
APPLICATION FILED JUNE 27, 1907.
906,430.
Patented Dec. 8, 1908.
5 SHEETS—SHEET 4.
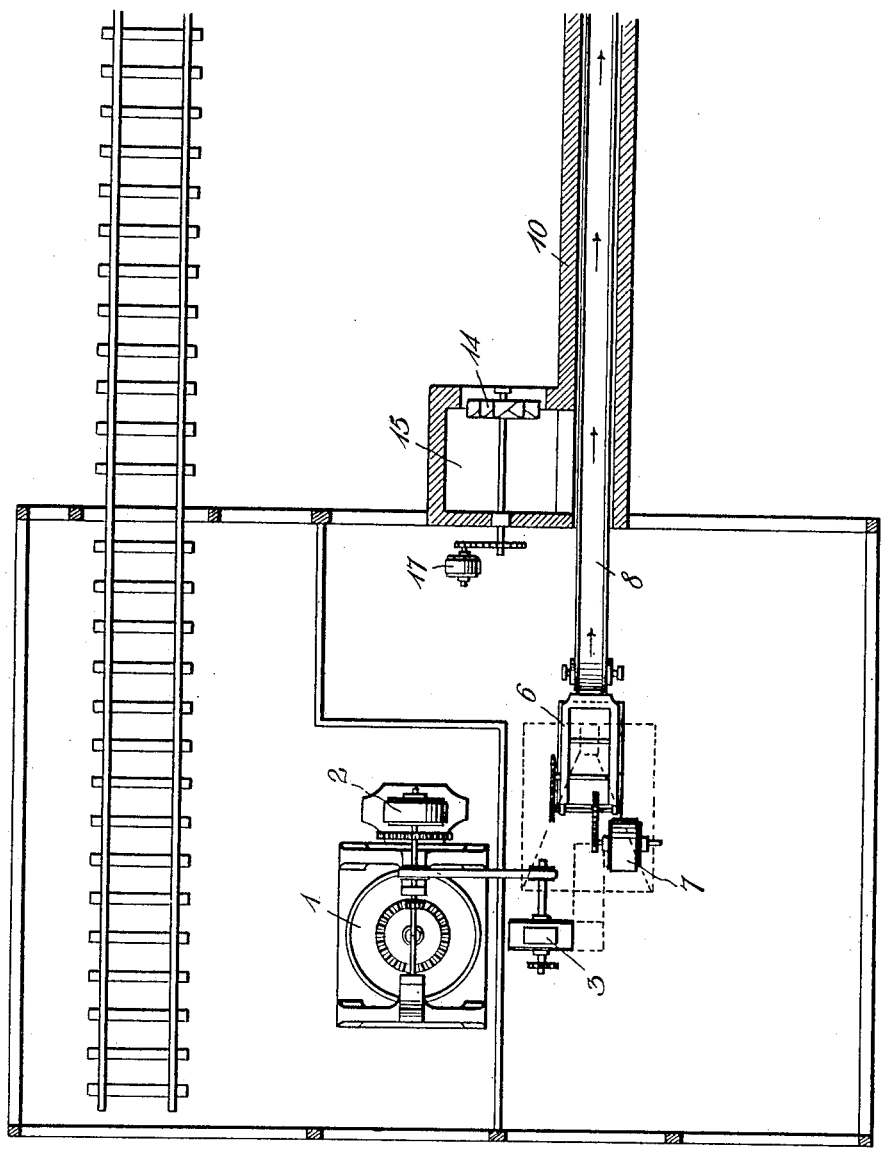
Witnesses
Inventor
John W. Ivery
by
Attorneys

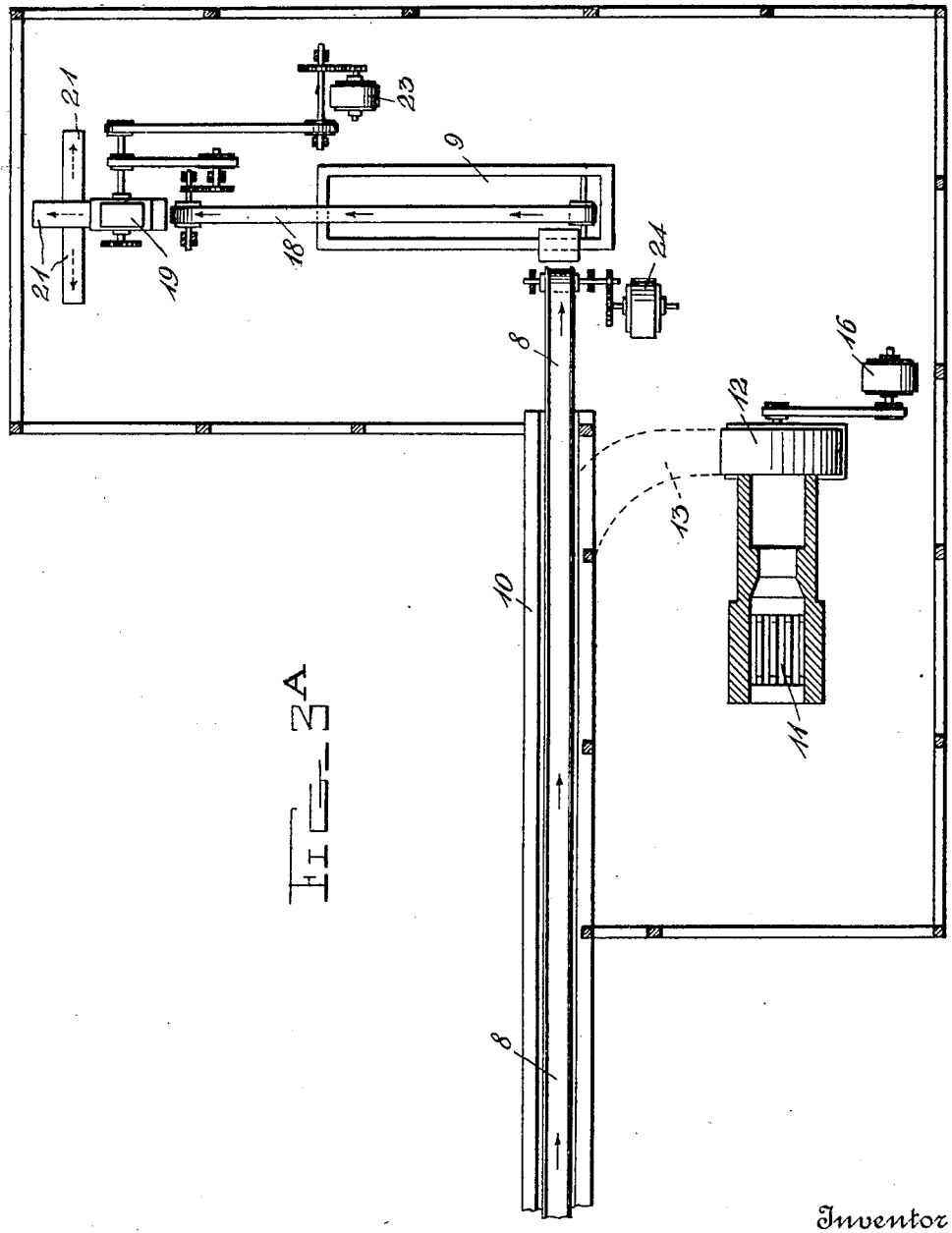

UNITED STATES PATENT OFFICE.

JOHN W. IVERY, OF DILLSBURG, PENNSYLVANIA, ASSIGNOR OF ONE-HALF TO CHARLES M. LINTHICUM, OF BALTIMORE, MARYLAND.

APPARATUS FOR MAKING BRIQUETS.

No. 906,430.  Specification of Letters Patent.  Patented Dec. 8, 1908.

Application filed June 27, 1907. Serial No. 381,108.

*To all whom it may concern:*

Be it known that I, JOHN W. IVERY, a citizen of the United States, residing at Dillsburg, in the county of York and State of Pennsylvania, have invented certain new and useful Improvements in Apparatus for Making Briquets; and I do declare the following to be a full, clear, and exact description of the invention, such as will enable others skilled in the art to which it appertains to make and use the same.

This invention relates to an improved apparatus for making briquets from artificial fuel, iron ore, or other material.

The invention has for one of its objects to provide an improved apparatus embodying a mixing device, a molding press, a drying apparatus, and a waterproofing and distributing mechanism wherein the raw material will be thoroughly mixed and then automatically delivered to the press to be molded into shape, the molded material or briquets being conveyed through the drying device and delivered therefrom to a waterproofing bath from which they are finally removed for distribution either to the floor of the storage shed or to cars to be carried away.

In the accompanying drawings, Figure 1 is a side elevation of the forward portions of an apparatus embodying the invention; Fig. 1<sup>A</sup> is a similar view of the rear portion of the apparatus. Fig. 2 is an end elevation of the same looking toward the delivery end of the drying conduit; Fig. 3 is a top plan view of the forward portion of the apparatus; Fig. 3<sup>A</sup> is a similar view of the rear portion of the apparatus.

Referring to the drawings, it will be seen that the improved apparatus embodies a mixing device or pan, 1, in which the material in its raw state is placed and thoroughly mixed, there being disposed adjacent to the mixing device, which is operated by means of a motor, 2, an elevator, 3, through the medium of which the mixed material upon delivery from the mixer is conveyed and deposited in an overhead storage bin or hopper, 4, having a flexible discharge tube or spout, 5, through which the material is delivered to a molding device or press, 6, which may be of any suitable form adapting it to mold the material into briquets of desirable size and shape.

Leading from the press 6, which is operated by means of a motor, 7, and to receive the molded material therefrom, is an endless conveyer, 8, which extends to and for delivering the material into a trough, 9, said conveyer being arranged to travel through an open-ended drying box or conduit, 10, which may be heated in any suitable manner. By preference, said conduit is heated in the manner herein shown by causing a current of heated air to flow therethrough, this heated air being taken from a furnace, 11, by means of a fan, 12, and directed into the drying conduit through a branch passage, 13, the heat being drawn through the conduit by means of a second fan, 14, operated in a vent stack, 15, which communicates with the rear end of the conduit, the fans, 12 and 14, being operated, respectively, by suitable motors, 16 and 17.

The conduit may be heated by electricity or otherwise, and any suitable devices for causing the current of heated air to flow through the conduit may be employed in lieu of the fans 12 and 14.

The box or trough, 9, which, in practice, receives a liquid waterproofing material, and may be broadly termed the waterproofing bath, has running longitudinally therethrough a conveyer, 18, adapted to receive the briquets from the discharge end of the conveyer 8, and, after passing the briquets through the waterproofing material, delivers them to the store-room or car or into an elevator, 19, by which they are raised to the floor of a store-house or shed, 20, and may, if desired, be distributed onto the floor of said shed, or discharged by means of a chute, 21, into a transporting car, 22, for conveyance to some distant point. The conveyer 18 and the elevator 19 are operated by means of a motor, 23, while the conveyer 8 is operated by means of a motor, 24.

In practice, the material in its crude or raw state, is fed into the mixing device or pan, 1, and after being thoroughly pulverized and mixed is delivered onto the elevator, 3, by means of which it is raised and deposited in the overhead bin, 4. The material is discharged from the bin as before explained, through the spout 5 to the press and molded into briquets of suitable size and shape, the briquets being discharged from the press onto the conveyer 8 and carried through the drying conduit, 10, in which they are subjected to the action of the heated air and from which they are finally delivered in a dried and heated state to the waterproofing bath, 9, being taken thence by the conveyer 18 and elevator 19 to the storage house or shed, as before mentioned.

It is to be particularly observed that under this improved apparatus the material is carried from its crude or raw state automatically through the various steps to the finished article, which involves the mixing of the material, pressing or molding the same into briquets of desired size and shape, subjecting the molded briquets to a drying process, waterproofing the otherwise completed briquets, and, finally, removing the briquets from the waterproofing bath.

It is to be understood that the different parts of the apparatus, such, for example as the mixing device and press, and the means for heating the drying conduit, and the motive power for operating the parts of the apparatus are conventionally shown herein and may, therefore, be of any preferred or appropriate construction and operation.

Having thus fully described my invention, what I claim as new and desire to secure by Letters-Patent, is:

A device of the character described comprising a mixing device, a molding device arranged on an approximate level with the mixing device, an upright conveyer for receiving the material directly from the mixing device and for elevating it above the mixing and molding devices for delivery to the latter, a long drying conduit leading directly from the molding device and extending in a horizontal plane and approximately at a level with the same, a conveyer arranged longitudinally within and extending beyond the conveyer to receive the molded material directly from the molding device, means for inducing a current of heated air through the conduit in a direction reverse to the direction of travel of said last mentioned conveyer, said means comprising a furnace arranged adjacent to the discharge end of the conduit, a suction fan to induce the heated air to pass from the furnace into the discharge end of the conduit and a second suction fan arranged at the opposite end of the conduit, a water proofing bath to receive the molded material directly from the last mentioned conveyer, a horizontal conveyer arranged therein, a vertical conveyer adapted to receive the water proofing material from the horizontal conveyer, and means for driving the molding and mixing devices, the conveyers and the fans.

In testimony whereof I have hereunto set my hand in presence of two subscribing witnesses.

JOHN W. IVERY.

Witnesses:
    PERCY O. IVERY,
    M. J. BAILEY.